No. 677,986. Patented July 9, 1901.
H. F. HOBEL.
PROCESS OF MAKING ACCUMULATOR ELECTRODES.
(Application filed Jan. 14, 1901.)
(No Model.) 2 Sheets—Sheet 1.

WITNESSES:
Ott Mauck
Barbara Cambis

INVENTOR
Heinrich Franz Hobel
by Richards
ATTORNEYS

No. 677,986.  
H. F. HOBEL.  
PROCESS OF MAKING ACCUMULATOR ELECTRODES.  
(Application filed Jan. 14, 1901.)

Patented July 9, 1901.

(No Model.)  
2 Sheets—Sheet 2.

WITNESSES:

INVENTOR  
Heinrich Franz Hobel  
ATTORNEYS

UNITED STATES PATENT OFFICE.

HEINRICH FRANZ HOBEL, OF BERLIN, GERMANY, ASSIGNOR TO ACCUMULATOREN AND ELECTRICITATS-WERKE ACTIENGESELLSCHAFT, VORM. W. A. BOESE & CO., OF SAME PLACE.

PROCESS OF MAKING ACCUMULATOR-ELECTRODES.

SPECIFICATION forming part of Letters Patent No. 677,986, dated July 9, 1901.

Application filed January 14, 1901. Serial No. 43,169. (No specimens.)

*To all whom it may concern:*

Be it known that I, HEINRICH FRANZ HOBEL, a subject of the Emperor of Austria, residing at the city of Berlin, in the Kingdom of Prussia, German Empire, have invented certain new and useful Improvements in the Process of Making Accumulator-Electrodes; and I do hereby declare that the following is a full, clear, and exact description.

The present invention relates to a novel process of making electrodes for accumulators on the Planté system.

As is well known, it has hitherto been desired to extend the surface of such electrodes as much as possible; but it is not possible to develop the surfaces any further by means of the processes already known. Electrodes the active ribs or teeth of which are designed to be only 0.1 millimeter thick can be made neither by casting nor stamping, as they cannot be got out of the molds or rollers without breaking. Nevertheless, for automobiles and transport purposes generally a further development of the surfaces is very desirable. This may be attained, according to this improved process, by providing a lead structure which consists of a central wall and ribs projecting therefrom, with a thin surface-covering, and then passing the electrode between rolls by which the ribs are rolled out thin against one another. The thin surface-covering is for the purpose of keeping the ribs separate from each other during the rolling and preferably consists of a thin coating of peroxid of lead or an easily-soluble paint. Lead strips may be employed as suitable forms of construction as well as plates. With lead plates in order to be able to roll the ribs out thin lengthwise they must incline toward the solid central piece preferably vertical to the central piece.

This new method is illustrated in the accompanying drawings, in which—

Figure 1:
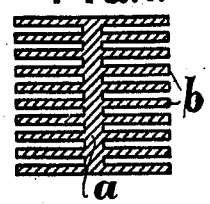
Figure 2:
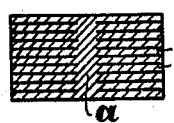
Figure 3:
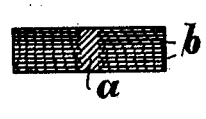
Figure 4:
Figure 5:
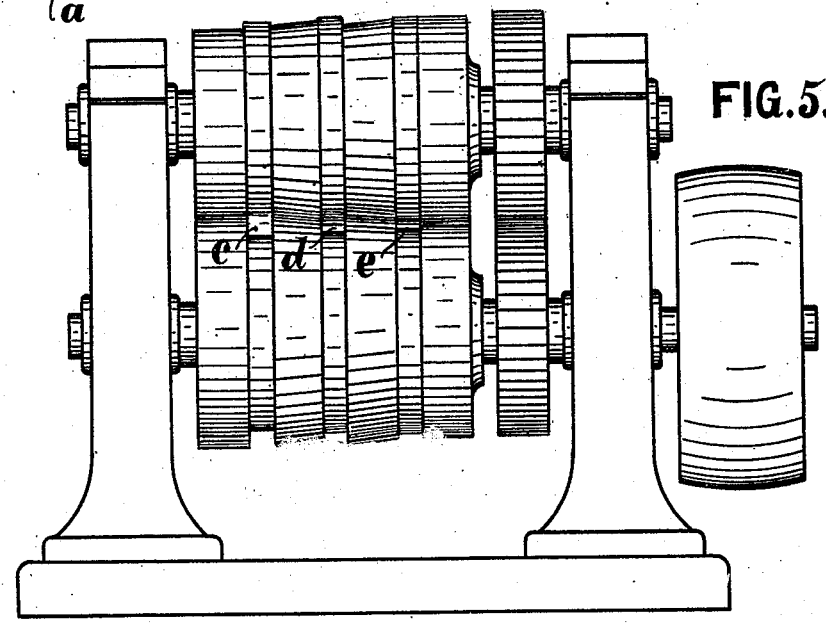
Figure 6:
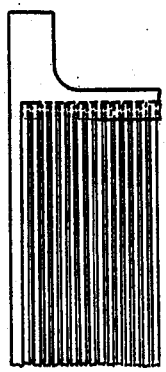
Figures 7, 8:
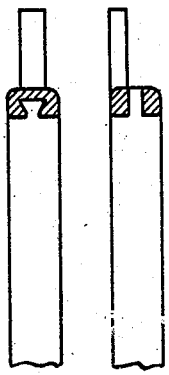
Figure 9:
Figure 10:
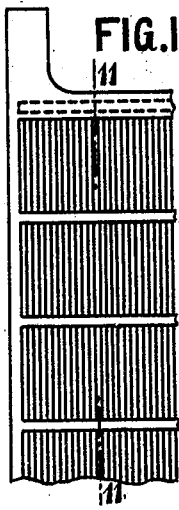
Figure 11:
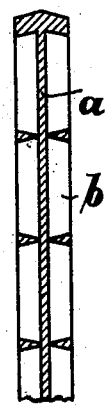
Figure 12:
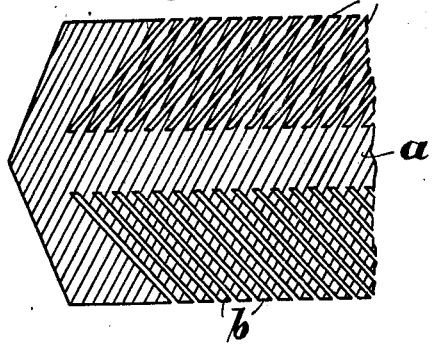
Figure 13:
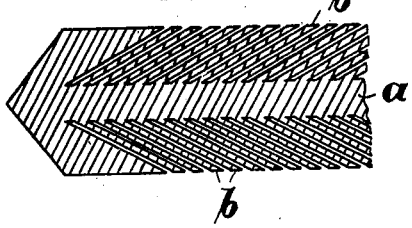
Figure 14:
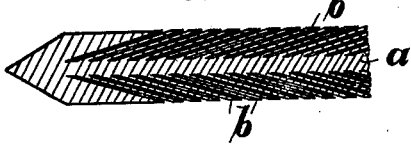
Figure 15:
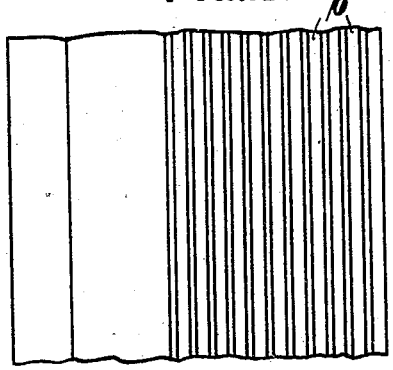

Figure 1 is a transverse section of a lead strip with ribs made by casting, hydraulic pressure, or the like in about threefold enlargement. Fig. 2 shows the same strip in the form it assumes when it has been rolled once. Figs. 3 and 4 illustrate the same when it has passed through the rolling mechanism a second and a third time, respectively. Fig. 5 is an elevation of the rolling mechanism employed in the present invention. Fig. 6 illustrates an electrode which consists of a number of the strips described above. The single strips are placed in a frame in the usual manner. Fig. 7 shows the method of connecting the strips with the frame by circumfusion. Fig. 8 shows them joined to the frame by soldering. Fig. 9 illustrates the arrangement of the single strips with a space between them which allows the usual swelling of the oxidized ribs. Fig. 10 shows an electrode provided with several strengthening-ribs. Fig. 11 is a transverse section on the line 11 11 of Fig. 10. Fig. 12 shows a lead plate made by casting or hydraulic pressure or otherwise, in which the ribs are set at an oblique angle to the center piece. Fig. 13 shows the same plate after it has been rolled once. Fig. 14 illustrates the same after it has been rolled twice. Fig. 15 is a face view of part of the plate of Fig. 14.

Fig. 1 illustrates a lead strip made by casting or pressure, having the central piece $a$ and the ribs $b$. This lead strip is provided with a coating of peroxid of lead or an easily-soluble paint and then rolled through rolls until it reaches the dimensions shown in Figs. 2, 3, and 4. The roller mechanism illustrated in Fig. 5 is preferably employed, the spaces $c$, $d$, and $e$ receiving successively the strips to be rolled. When the strip has passed through the rolling mechanism at $c$, it is only half as thick as before. When it has passed through the roller at $d$, it has only a quarter, and when through the roller at $e$ only the eighth, part of its original thickness.

The strip illustrated in Fig. 1 has ribs about five millimeters long and 0.5 millimeter thick. The distance between the ribs is also about 0.5 millimeter. This structure can be made either by casting or by pressure. Owing to the arrangement of the ribs the active faces are about eleven times as large as the corresponding surface would be without the ribs. In Fig. 2 the active faces are twenty-two times as large, in Fig. 3 forty-four times, and in Fig. 4 eighty-eight times, as large. By means of the new process the ribs can easily be rolled until they are 0.05 millimeter thick. Nevertheless, the electrodes thus produced are far superior to constructions of lead-foil, because they are made in one piece with the center piece. The strips rolled thin may be employed directly as electrodes. If they are to be compounded into larger plates, they are preferably provided with a dovetailed rim and circumfused with liquid lead, Fig. 7. The strips may also be soldered into a lead frame, Fig. 8.

In order that the oxidized ribs can swell or spread a little, a small space is preferably left between the single strips, Fig. 9.

Instead of rolling the single strips and then putting them together to form a large plate, these plates themselves can be rolled out according to the present invention. To do this, the ribs must be at an oblique angle to the central piece. The plate must have from the beginning the requisite surface per unit of length, but with such a thickness that the ribs can be rolled out to the required amount. These plates are illustrated in Figs. 12 to 15. The increase of size of the plates can take place by the thinly-rolled ribs taking a wider angle to the plane of the plate, consequently standing up to a certain extent. The plates are thus rendered thicker, so that the quantity of the electrolyte inside the plate increases, as is desirable.

Having now described my invention, what I claim as new, and desire to secure by Letters Patent, is—

1. Process for making accumulator-electrodes consisting in the covering of a lead structure, which has a center wall and ribs projecting therefrom, with a thin surface-coating and then passing it between rolls, which roll the ribs thin one against the other substantially as shown and described.

2. Process for making accumulator-electrodes consisting in the covering of a lead plate, having a center wall and obliquely-projecting ribs with a thin surface-coating and then passing it through rolls, whereby the ribs mutually roll one another out in the direction of their length substantially as shown and described.

In witness whereof I have hereunto set my hand in presence of two witnesses.

HEINRICH FRANZ HOBEL.

Witnesses:
HENRY HASPER,
WOLDEMAR HAUPT.